Patented June 22, 1937

2,084,482

UNITED STATES PATENT OFFICE 2,084,482

FLUID COMPOSITION

George L. Doelling, St. Louis, Mo., assignor to Wagner Electric Corporation, St. Louis, Mo., a corporation of Delaware No Drawing. Application December 3, 1934
Serial No. 755,770

7 Claims. (Cl. 252—5)

My invention relates to a fluid composition suitable for use in fluid pressure devices such as hydraulic actuating equipment for vehicle brakes.

Fluid for hydraulic braking equipment of the kind now generally employed must have lubricating quality and not adversely affect the rubber piston sealing elements or be corrosive to metals of the kind used in the manufacture of the apparatus. Its viscosity characteristics must be such that it will retain some viscosity at temperatures considerably above maximum atmospheric temperatures, and its viscosity should not be too high at minimum atmospheric temperatures to prevent its flow under relatively low pressure.

It is also important that such fluid be not hygroscopic, since water will corrode the metal surfaces of a hydraulic pressure system; and that it have a high gassing point, since under conditions of brake service, the fluid, particularly the portion in the wheel brake mechanism, is subjected to temperatures much above atmospheric due to the heat developed by the brake friction elements during brake application.

Castor oil is commonly used as the lubricating element for brake fluids due to the fact that it has little, if any, deteriorating effect upon rubber. Other suitable lubricating elements for such fluid are mono or di-ricinoleates of mono, di, or tri-hydroxy alcohols (the alcohol having not over five carbon atoms per molecule). Oils not reactive with the diluent and which have a low solidifying point, are stable at 250° F. or higher and whose deteriorating effect on the various parts of the brake system is relatively slight, may be used as lubricant elements in these fluids.

The present invention is primarily concerned with the diluent element of a hydraulic brake fluid, the object being to produce a fluid having a high gassing point and stability at high temperatures while retaining the other required characteristics.

I have discovered that the following ketone alcohols are suitable as diluents for use with the above and other lubricating elements:

2-hydroxy 4-keto 3-methyl pentane $$[CH_3COCH(CH_3)CH-OHCH_3]$$

acetyl-butyl alcohol $$(CH_3COC_3H_6CH_2-OH)$$

4-hydroxy 2-keto 3-methyl heptane $$[CH_3COCH(CH_3)CH-OHCH_2CH_2CH_3]$$

If a ketone alcohol has less than six carbon atoms per molecule, the fluid employing it as a diluent will be hygroscopic. Hydracetyl acetone is an example of such alcohol. If a ketone alcohol has more than eight carbon atoms per molecule it will have too great an effect upon the rubber elements of the brake apparatus and its viscosity at low temperatures will be too high and its freezing point not low enough for use in colder climates. Generally speaking, a ketone alcohol suitable for the desired purpose should be either a primary or a secondary alcohol having not less than six nor more than eight carbon atoms per molecule, the hydroxy group being attached to a carbon atom not adjacent the carbonyl group. It will, therefore, be understood that the particular alcohols above listed are given as examples and that the scope of my invention is not confined to them.

A suitable formula for fluid in accordance with my invention is 35 parts castor oil and 65 parts of the ketone alcohol $CH_3COCH(CH_3)CH-OHCH_3$. To substitute a mono or di-ricinoleate ester for castor oil produces a fluid having a lower freezing point, but since such lubricant is more expensive than castor oil, a preferred formula is 65 parts $CH_3COCH(CH_3)CH-OHCH_3$; 15 parts ethylene glycol mono-ricinoleate; and 20 parts castor oil.

The portions of the lubricant and diluent elements may be considerably varied, and it will be understood that those above given are selected simply as preferable for a fluid suitable for a wide range of climates. For example, in a fluid intended for use only in very warm climates, the proportion of diluent may be considerably reduced and of lubricant, correspondingly increased, whereas in a fluid intended for use only in extremely cold climates, the proportion of diluent should be considerably increased and that of lubricant, decreased.

It is desirable to use, in the fluids herein described, a small amount (approximately .05 per cent) of an acidity neutralizing agent such as potassium arsenite or potassium hydroxide.

Having fully described my invention, what I claim as new and desire to secure by Letters Patent of the United States is:

1. An operating liquid for fluid pressure apparatus, comprising oil substantially inert to rubber and a ketone alcohol having not less than six nor more than eight carbon atoms per molecule, the alcohol being either a primary or a secondary alcohol and the hydroxy group being attached to a carbon atom not adjacent the carbonyl group.

2. An operating liquid for fluid pressure apparatus, comprising oil substantially inert to rubber and a ketone alcohol having not less than six nor more than eight carbon atoms per molecule, the alcohol being either a primary or a secondary alcohol and the hydroxy group being attached to a carbon atom not adjacent the carbonyl group, said liquid consisting of approximately 35 parts of said oil and approximately 65 parts of said ketone alcohol.

3. An operating liquid for fluid pressure apparatus, comprising a ricinoleate ester of a mono, di or tri-hydroxy alcohol, the alcohol having not over five carbon atoms per molecule, and a ketone alcohol having not less than six nor more than eight carbon atoms per molecule, the ketone alcohol being either a primary or a secondary alcohol and the hydroxy group being attached to a carbon atom not adjacent the carbonyl group.

4. A fluid comprising ethylene glycol monoricinoleate, castor oil, and a ketone alcohol having not less than six nor more than eight carbon atoms per molecule, the alcohol being either a primary or a secondary alcohol and the hydroxy group being attached to a carbon atom not adjacent the carbonyl group.

5. An operating liquid for fluid pressure apparatus, comprising a ricinoleate ester of a mono, di or tri-hydroxy alcohol, the alcohol having not over five carbon atoms per molecule, and the ketone alcohol 2-hydroxy 4-keto 3-methyl pentane.

6. An operating liquid for fluid pressure apparatus, comprising an aliphatic ketone alcohol having not less than six nor more than eight carbon atoms per molecule, the ketone alcohol being either a primary or a secondary alcohol and its hydroxy group being attached to a carbon atom not adjacent the carbonyl group, and an oil characterized by low solidifying point, stability at high temperatures and inertness toward rubber.

7. An operating liquid for fluid pressure apparatus, comprising castor oil and an aliphatic ketone alcohol having not less than six nor more than eight carbon atoms per molecule, the alcohol being either a primary or a secondary alcohol and its hydroxy group being attached to a carbon atom not adjacent the carbonyl group.

GEORGE L. DOELLING.